United States Patent
Bourgart

(10) Patent No.: US 8,416,816 B2
(45) Date of Patent: Apr. 9, 2013

(54) RECONFIGURATION OF NETWORK TERMINATION DEVICES

(75) Inventor: Fabrice Bourgart, Perros Guirec (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 12/676,010

(22) PCT Filed: Sep. 2, 2008

(86) PCT No.: PCT/FR2008/051561
§ 371 (c)(1), (2), (4) Date: Jun. 28, 2010

(87) PCT Pub. No.: WO2009/047413
PCT Pub. Date: Apr. 16, 2009

(65) Prior Publication Data
US 2011/0013649 A1    Jan. 20, 2011

(30) Foreign Application Priority Data
Sep. 4, 2007    (FR) ...................................... 07 06193

(51) Int. Cl.
*H04J 3/12* (2006.01)
(52) U.S. Cl. ...................................................... 370/524
(58) Field of Classification Search ................... 370/524; 709/220, 221
See application file for complete search history.

(56) References Cited

U.S. PATENT DOCUMENTS

| | | | |
|---|---|---|---|
| 5,442,702 A * | 8/1995 | van Ooijen et al. | ........... 713/162 |
| 6,526,092 B1 | 2/2003 | Nelson et al. | |
| 7,111,072 B1 | 9/2006 | Matthews et al. | |
| 2003/0041136 A1 | 2/2003 | Cheline et al. | |

FOREIGN PATENT DOCUMENTS

| | | |
|---|---|---|
| EP | 0 643 505 A1 | 3/1995 |
| EP | 1 126 639 A1 | 8/2001 |

* cited by examiner

*Primary Examiner* — Chandrahas Patel
(74) *Attorney, Agent, or Firm* — Drinker Biddle & Reath LLP

(57) ABSTRACT

A method enables communication between a line termination device and at least one network termination device, the line termination device being connected by at least one line to the at least one network termination device. The method includes a step in which frames containing content data are transmitted by the line termination device via the line to at least one of the at least one network termination devices. Reconfiguration data is sent by the line termination device to at least one of the network termination devices, the reconfiguration data being specific to a communication protocol to be used for the transmission of the above-mentioned frames and enabling the reconfiguration of a modem of the destination network termination device.

8 Claims, 3 Drawing Sheets

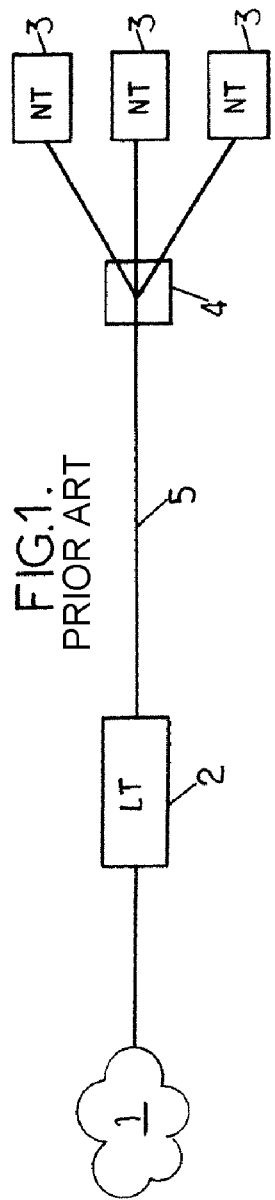
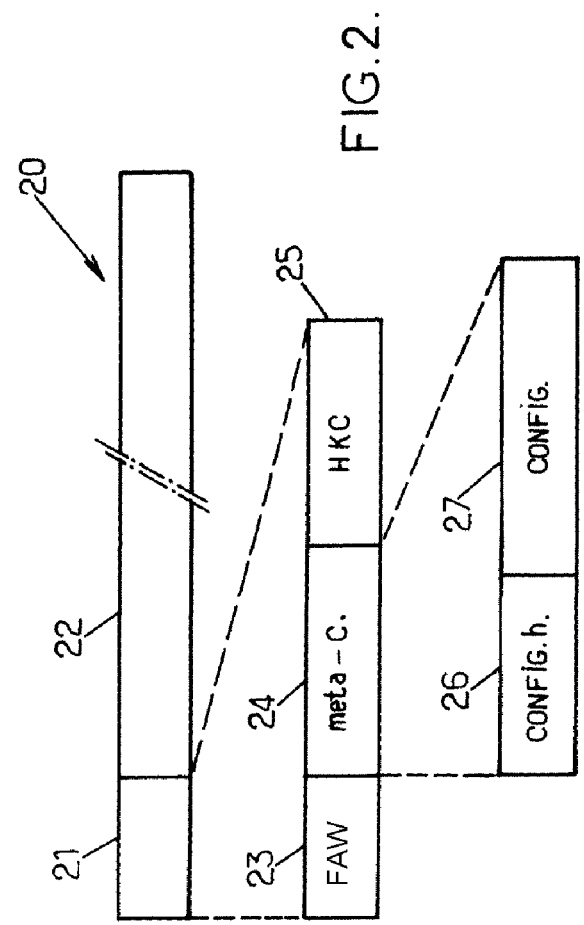

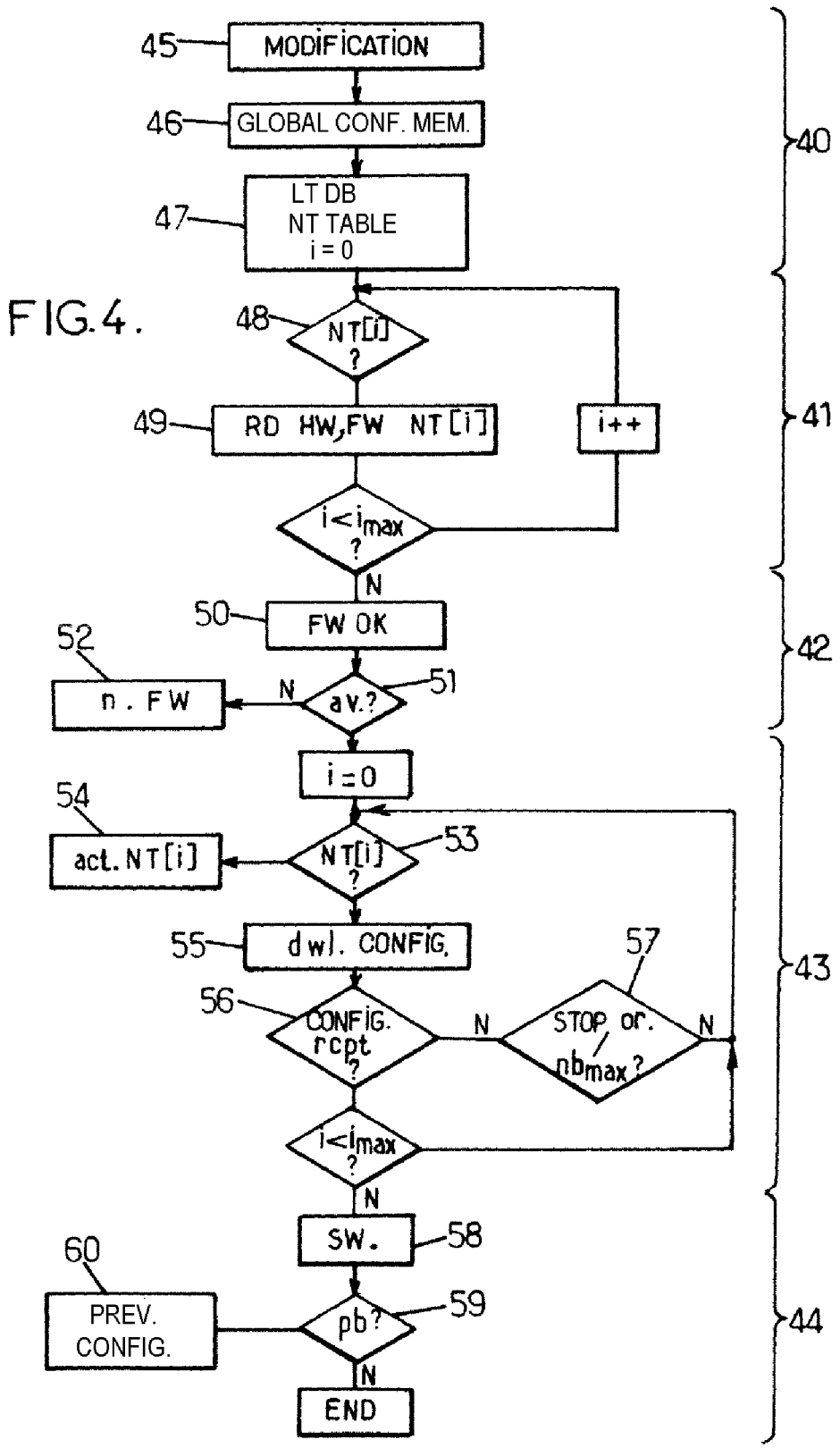

RECONFIGURATION OF NETWORK TERMINATION DEVICES

CROSS-REFERENCE TO RELATED APPLICATIONS

This application is the U.S. national phase of the International Patent Application No. PCT/FR2008/051561 filed Sep. 2, 2008, which claims the benefit of French Application No. 07 06193 filed Sep. 4, 2007, the entire content of which is incorporated herein by reference.

FIELD OF THE INVENTION

The invention relates to the field of telecommunications networks, and relates in particular to communications over at least one line between a line-termination device and a group of network-termination devices.

BACKGROUND

FIG. 1 represents schematically such a tree-structure network.

A line-termination device 2 is connected by a line 5, for example an optical fiber or a copper line, to a group of network-termination devices 3. Dividers shown under reference number 4, for example optical dividers, may be used for sharing the signals originating from the line-termination device 2 between the network-termination devices 3. The device 2 provides the interface with the rest of the telecommunications network shown under reference number 1, for example the Internet network.

Each network-termination device comprises a modem, making it possible to perform functions such as modulation, demodulation, multiplexing, demultiplexing, etc., depending on the communication protocol used on the line.

The line 5 is shared between several network-termination devices 3. The device 2 may optionally manage the allocation of this shared resource between the devices 3. For example, the devices 3 may each have a timeslot for transmitting messages to the line-termination device 2. It is the device 2 which sends messages to the devices 3 indicating which of these devices is entitled to transmit during a given timeslot. Such a technology is, for example, TDMA (Time Division Multiple Access).

The communications on the line are governed by a protocol, that is to say a set of descriptions of formatting, segmentation and sharing of data between several applications and several network-termination devices.

A communication protocol on the line covers both the format of the payload data interchanged over the line (for example divided into octets or into ATM cells), and the format of the frames interchanged (for example a format defining the frame headers), the type of sharing or multiplexing of the resources (for example WDM, "Wavelength Division Multiplexing"), the communication mode (PMP for example), the nature of the traffic supported (half-duplex, full-duplex, simplex, etc.), etc.

The communications protocol over the line is likely to change. Other access technologies may be used.

For example, in the case of an optical line, the protocol used has evolved changing from a fixed multiplexing of octets (the TPON "Telecommunication over Passive Optical Network" format, and point-to-multipoint passive optical transmission mode according to the ITU-T recommendation G.982 and the ETSI standard ETS.300 463) to a dynamic multiplexing of ATM ("Asynchronous Transfer Mode") cells in native mode or on an STM1/STM4 "Synchronous Transport Module" (the APON then BPON format, for "ATM-based PON" and "Broadband PON" respectively, and point-to-multipoint passive optical transmission mode based on ATM according to the ITU-T recommendations G.983) or to a native Ethernet multiplexing (the EPON, GEPON or GigE format for "Ethernet PON", "Gigabit Ethernet PON" and "Gigabit Ethernet", in point-to-multipoint mode according to an IEEE standard), then finally to a dynamic multiplexing of octets (the GPON, for "Gigabit PON", protocol).

The protocol governing the communications over the line is naturally still likely to evolve, perhaps according to a format with MPLS "Multi-Protocol Label Switching" encapsulation.

Other service-integration multiplexing formats will probably appear.

It is known practice to replace the network-termination devices 3 in order to carry out these protocol upgrades. However, the use of this solution is complex and costly because of the manufacture of new devices, and of the replacement operations to be arranged for the network terminations. Moreover, such a solution requires an interruption of service while the network-termination device is replaced.

An alternative solution consists in providing each user with a medium of the USB key type storing a program for reconfiguration of a network-termination device. With the latter solution, in the case of point-to-multipoint (or PMP) communications, the modifications affecting a plurality of network-termination devices must be made in a relatively short time period, and simultaneously, so that the communications over the shared line operate correctly.

There is a need for a low-cost solution for the reconfiguration of network-termination devices that is simple to apply and that does not require service interruption.

SUMMARY

According to one aspect, the subject of the invention is a method of communication between a line-termination device and at least one network-termination device, the line-termination device being connected by at least one line to this at least one network-termination device, the method comprising a step of transmission, by the line-termination device, via said line, to at least one of the network-termination device(s), of frames comprising content data. The line-termination device transmits, to at least one or more of the network-termination device(s), reconfiguration data specific to a communication protocol to be used for the transmission of these frames, these reconfiguration data allowing a reconfiguration of a modem of said destination network-termination device.

Therefore, the line-termination device is used both for transmitting content data included in frames conforming to a communication protocol and for commanding at least in part the possible changes of this communication protocol over the line.

These protocol modifications are typically carried out by reconfiguring at least certain of the network-termination devices. The reconfiguration data may, for example, comprise a reconfiguration file designed to reprogram at least one component of these network-termination devices.

For example, the reprogrammed component may comprise a modem. The modifications that are made may for example consist in the supply of new parameters, or else in the supply of an executable file in order to establish a new communication protocol over the line. It is thus possible to have only certain functionalities of the modem configured, for example the modulation.

The reconfiguration data are thus capable of reconfiguring one or more network-termination devices, so that these devices use a new communication protocol over the line.

For example, the protocol is defined by a software layer of the line- and network-termination devices, and the updating of the protocol comprises a modification of the software layer of all or some of the network-termination devices.

This software layer may comprise a data link layer managing the communications between adjacent items of equipment, in this instance between the line-termination device and at least one network-termination device.

In particular, this software layer may comprise an MAC for "Medium Access Control" layer. The reconfiguration data may make it possible to modify an MAC layer format, for example a format defined in one of the standards 802.3, 802.x where x is more than 3, of one or more of the network-termination devices.

Such a method makes the replacement of the network-termination devices unnecessary, since the latter can be updated on the initiative of the line-termination device, within the limit of their compatibility with the required performance. The invention makes easier the possible upgrades of the over-the-line communication protocol used by the network-termination devices.

The envisaged protocol modifications are compatible with the performance required in that account is taken of the hardware limitations of the equipment used. For example, the speed of modulation, the granularity of the allocation of timeslots between clients, etc. can be limited because of the non-zero up and down time of the components of the line- and/or network-termination devices.

This method makes it possible to carry out switchovers of the network-termination devices to a new protocol simultaneously, thus avoiding possible interference making the link inoperative in the up direction (from the network-termination devices to the line-termination device).

Moreover, the line-termination device may provide the interface with a telecommunication network of the Internet type. This line-termination device has real-time knowledge of the nature and the version of the connected network-termination devices and of the state of the communications over the shared line. The reconfiguration of the line-termination devices in order to change the communication protocol over the line may therefore be carried out with no risk of disruption associated with a lack of information concerning the state of the traffic on the line, as could be the case if a distinct device of the line-termination device were planned to perform this reconfiguration.

In particular, if the service provider and the network provider are different, it could be relatively dangerous to leave service providers in a situation of concurrent management of network terminations connected to one and the same shared physical medium, to reconfigure the network-termination devices via a platform, to the extent that these service providers may have a relatively incomplete knowledge of the state of the network.

Finally, with the communication method that is the subject of the invention, it is possible to envisage modifications of the line-termination device, for example replacement, without having to replace the corresponding network-termination devices.

The communication method that is the subject of the invention therefore allows a communication protocol update over the line, for example in order to be adapted to new standards, that is relatively reliable, rapid and economical.

Moreover, the user of a given network-termination device may wish to change operator. With the communication method that is the subject of the invention, this change of operator can also be managed by the line-termination device, thus avoiding the drawbacks associated with the replacement of the network-termination device.

"Communication protocol over the line" means any protocol governing the communications between adjacent items of equipment, for example the protocols defined by a data link layer such as an MAC layer.

Advantageously, the line-termination device broadcasts to at least one of the network-termination devices management data to manage an allocation of a resource shared between the network-termination devices, which provides entitlement to only one or several of them to use a resource depending on whether a broadcast or dedicated mode is chosen. Therefore, the line-termination device manages the allocation of the shared resource between the network-termination devices. "Shared resource" typically means the bandwidth of the line.

For example, in the case of point-to-multipoint communications over a passive network, the management data are broadcast to all the network-termination devices, but it is possible to add a criterion which makes these management data readable to a group of network-termination devices only or to a single network-termination device.

Alternatively, it is a third-party device which manages the allocation of the shared resource, or else the chosen communication mode carries out a correct management of the line resources. For example, a P2P (Peer to Peer) communication mode is provided. In this case, the method according to one aspect of the invention allows protocol modifications in order to switch to a shared mode, for example PMP.

According to another aspect, the subject of the invention is a line-termination device designed to be connected by at least one line to at least one network-termination device, this line-termination device being arranged to transmit via said line to one or more network-termination device(s) frames comprising content data, and reconfiguration data specific to a communication protocol to be used for the transmission of said frames and allowing a reconfiguration of a modem of said destination network-termination device.

This device makes it possible to apply the method according to another aspect of the invention.

Advantageously, this device is arranged to transmit to at least one of the network-termination devices management data for managing an allocation of a resource shared between the network-termination devices.

According to yet another aspect, the subject of the invention is a method of communication between a line-termination device and a network-termination device, said line-termination device being connected by at least one line to this network-termination device, the method comprising a step of reception, by the network-termination device, via said line, originating from the line-termination device, of frames comprising content data. The network-termination device receives, from the line-termination device, reconfiguration data specific to a communication protocol to be used for the transmission of these frames and allowing a reconfiguration of a modem of said network-termination device.

According to yet another aspect, the subject of the invention is a network-termination device designed to be connected by at least one line to a line-termination device, the network-termination device being arranged to receive, via said line, frames comprising content data originating from the network-termination device, and to receive reconfiguration data originating from the line-termination device, said reconfiguration data being specific to a communication protocol to be used for the transmission of said frames and allowing a reconfiguration of a modem of said network-termination device.

According to yet another aspect, the subject of the invention is a computer program designed to be stored in a memory of a line-termination device designed to be connected by at least one line to at least one network-termination device, and/or stored on a memory medium designed to interact with a drive of said line-termination device and/or downloaded, the program comprising instructions for executing the following steps:

transmitting, via said line to at least one of said at least one network-termination device, frames comprising content data, and reconfiguration data specific to a communication protocol to be used for the transmission of said frames and allowing a reconfiguration of a modem of said destination network-termination device.

According to another aspect, the subject of the invention is a computer program designed to be stored in a memory of a network-termination device designed to be connected by at least one line to a line-termination device, and/or stored on a memory medium designed to interact with a drive of said network-termination device and/or downloaded, the program comprising instructions for executing the following steps, receiving via said line frames comprising content data originating from the network-termination device, receiving reconfiguration data originating from the line-termination device, said reconfiguration data being specific to a communication protocol to be used for the transmission of said frames and allowing a reconfiguration of a modem of said network-termination device.

The invention is not limited by the type of reconfiguration data. It may, for example, involve a file for programming a component of the network-termination device, for example a controller, a DSP ("Digital Signal Processor"), or a programmable logic circuit, for example a "Field Programmable Gate Array" (FPGA). The reconfiguration data may comprise a netlist (that is to say a file containing a description of schematic design elements and their interconnections), instructions of lower or higher level, uncompiled instructions, for example if the network-termination device comprises a compiler, instructions in assembler, etc.

The shared line may for example be a physical line, for example an optical and/or copper line. The invention may also be applied in the context of optical transmissions in free space (laser guns) or even radio transmissions using the temporal domain as a method of sharing the resources (Wifi or Wimax).

The line-termination device may for example comprise an OLT ("Optical Line Termination") device, an ACS ("Auto Configuration Server") device or an MSAN ("Multi Service Access Node") device.

The network-termination devices may, for example, comprise MC ("Media Converter") devices, xTU-R ("Remote Copper Termination Unit") devices, ONU ("Optical Network Unit") devices, ONT ("Optical Line Terminal") devices, etc.

A network-termination device may incorporate, in addition to a device fulfilling a modem function, a device of the home gateway type fulfilling a router function. In this case, it is one and the same device which manages the data interchange with an access network, the modifications of which depend on the decisions of the regulator, on the competition and on the private-sector accounting rules, and with a domestic network, which, for its part, is under the sole control of the end user. The invention makes it possible to avoid replacing this common device, and therefore the disruptions within the domestic network that would be associated with this replacement.

Alternatively, a device of the home gateway type can be provided downstream (in the downward direction, that is to say in the direction from the line-termination device to at least one network-termination device) from the network-termination device to the client installation. For example, the network-termination device comprises a device of the ONU type performing the function of a collective optical modem for the foot of a multi-storey building. This ONU device is connected via copper links to several items of user equipment of the CPE ("Customer Premises Equipment") type which form another network-termination device specific to each client.

It is also possible to provide no device of the home gateway type. In general, the invention makes it possible to preserve the access network continuity, of the domestic installation and the services, and is not limited by type of installation at the end of the line.

The invention is not limited by the nature of the traffic supported. It is possible, for example, to provide a two-fiber transmission, a semi-duplex mode, and a full-duplex mode. It is also possible, as described in application EP1126639, to let the line- and network-termination devices agree between them on the nature of the traffic to support on the line.

Nor is the invention limited by the manner in which the allocation of the resource shared between the network-termination devices is managed. It is possible, for example, to provide frequency-division multiplexing, time-division multiplexing or else a collision-management technology of the CSMA/CD ("Carrier Sense Multiple Access with Collision Detection") type.

It is possible to make provision to use multi-rate frames as described in application EP0643505, thus making it possible to adapt the required performance to suit the real payload bit rate. The invention thus makes it possible to modify the MAC layer of an existing network-termination device to use these multi-speed frames.

In the case of time-division multiplexing, a TDMA ("Time Division Multiple Access") format can be used. The line-termination device can manage the allocation of the shared resource by sending authorizations to transmit in the upline direction, that is to say from a network-termination device to the line-termination device, during a given timeslot. The management data transmitted by the line-termination device can include synchronization data. These synchronization data can form part of a determined field of the frames transmitted by the line-termination device, or else be transmitted in frames dedicated to managing the allocation of the shared resource.

In the case of collision management of the CSMA/CD type, it is possible to provide packets dedicated to the transmission of management data. Alternatively, the management data are transmitted in a management field that is present in the frames transmitted by the line termination.

Therefore, according to another aspect, a subject of the invention is a frame designed to be transmitted between a line-termination device and at least one network-termination device, said line-termination device being connected by at least one line to said at least one network-termination device. This frame comprises reconfiguration data specific to a communication protocol to be used for the transmission of frames between said line-termination device and said at least one network-termination device, these reconfiguration data allowing a reconfiguration of a modem of said network-termination device.

Such a frame can be sent by a line-termination device according to one aspect of the invention.

Advantageously, the frame comprises a content field designed to transfer content data originating from a telecommunications network connected to said line-termination device, and a reconfiguration field suitable for transferring reconfiguration data capable of modifying said protocol.

Advantageously, the frame also comprises a management field suitable for transferring management data suitable for managing an allocation of a resource shared between the network-termination devices.

In general, a method of communication over a tree-structured network is applied. A line-termination device provides the interface between at least one network-termination device and a telecommunications network. Frames comprising content data are thus transmitted over a line between the line- and network-termination devices, these frames conforming to a determined communication protocol. For an update of the protocol, the line-termination device transmits to at least one network-termination device reconfiguration data suitable for modifying this protocol.

The transfer of these reconfiguration data may use a reconfiguration channel distinct from a transmission channel dedicated to the transfer of content data. For example, the reconfiguration channel may use a dedicated reference carrier frequency, if the multi-plexing is carried out in frequency. The reconfiguration channel may also use an optical wavelength, for example, a wavelength header. Alternatively, if the reconfiguration is desired to be across several multiplexing technologies, the reconfiguration data will be broadcast in a synchronized manner on each electric frequency or wavelength.

The reconfiguration channel may be formatted in ATM cells, or Ethernet, IP or MPLS, etc. packets that can be identified by the network-termination device in an implicit manner by its location in an MRT or TDM framing or in an explicit manner by the recognition of a dedicated address, which must be an invariant element or a predetermined option that can be detected by the network termination, which is indispensible in particular for the network-termination devices that have remained on an earlier MAC-layer format.

Provision can be made for the reconfiguration channel, also called the meta-channel, to be used only in communications over the shared line, between the line- and network-termination devices.

It is also possible to arrange for frames comprising a header field indicating whether the frame transfers content data, management data and/or reconfiguration data over the line (between the line- and network-termination devices).

"Frame" means a time-related division of the resource. Such a division is periodic and forms a framing pattern. Such a frame forms a time-related reference making it possible to reset terminations situated at different distances. This frame contains content data and service information, usually situated in a header zone of the frame. Depending on the context, a frame may consist of data packets, a datagram, a data block, or another expression of this type.

The frames transmitted by the line-termination device may comprise a content field, a management field and/or a reconfiguration field.

BRIEF DESCRIPTION OF THE DRAWINGS

Other particular features and advantages of the present invention will appear in the following description.

FIG. 1 shows an example of a known tree-structure network of the prior art.

FIG. 2 shows very schematically a downlink frame according to one embodiment of the invention.

FIG. 4 is a flow chart of a typical algorithm that can be executed by a device according to one embodiment of the invention.

DETAILED DESCRIPTION

Figure 3:
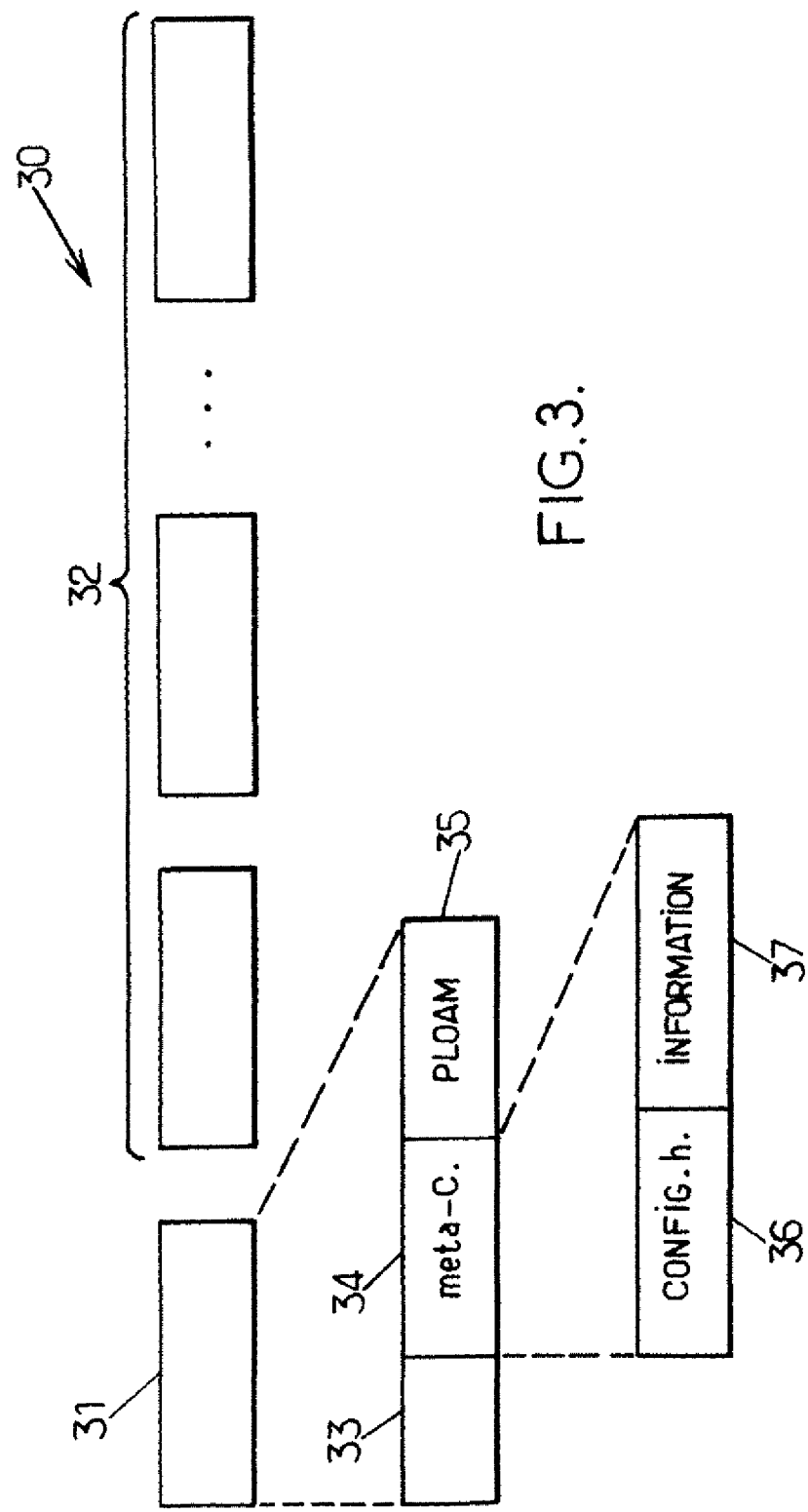
FIG. 3 shows very schematically an uplink frame according to one embodiment of the invention.

The embodiments shown relate to a solution for controlling modifications of the MAC layer of network-termination devices sharing a tree-structure line, for example an optical fiber.

These network-termination devices or NTs are connected to a telecommunication network via a line-termination device or LT ("line terminal") situated at the end of the line.

The line-termination device transmits to network-termination devices frames comprising, in their header, a meta-channel or reconfiguration channel field. Such a meta-channel is provided for controlling the modifications of the MAC layer of the network-termination devices.

The meta-channel allows upgrades of the communication protocol between the LT and the NTs, that is to say for example of the clock frequency, the line coding, the scrambling, the data encryption and the way in which the bandwidth of the line is shared between the NTs, the format of the data interchanged, the communication mode, etc., to the extent of the hardware limitations of the NTs, of the LT and of the line, and to the extent that the processing of the meta-channel field of the received frames is possible.

The bandwidth of the line can be shared by time-division multiplexing, according to a TDMA format for example. The meta-channel may then comprise a header, called the reconfiguration header, that is present in each downlink frame, that is to say broadcast by the LT to one or more NTs authorized to use it. This reconfiguration header is advantageously placed next to a time synchronization field, which is also included in the frame header so as to be identifiable as soon as there is synchronization by the NTs.

The meta-channel consists of two fields: the reconfiguration header and a field containing the reconfiguration data. The header field of the meta-channel manages the interchanges between LT and NTs. This field is filled with data when a new configuration is downloaded.

The frame header also comprises a field called the PLOAM which is variable with respect to its nature and manages the MAC layer. The PLOAM field immediately follows the meta-channel in the frame header. It contains the explicit declaration of the frame division, and of the data operation mode, which provides great flexibility of use. According to another example, described below with reference to FIG. 2, the field containing the reconfiguration data contains a configuration file, for example a netlist, or a file for programming a programmable component, or code for a DSP. The type of this configuration file is previously established by the manufacturer of the NT according to the specifications of the operator. It is possible to make provision to allow the manufacturer the option of choosing from several types of configuration files, for example netlist or executable, the LT then transmitting if necessary several types of configuration files depending on the NTs present on the network.

FIG. 2 illustrates a downlink frame structure according to one embodiment of the invention. This frame 20 consists of a frame header 21 and a field 22 dedicated to the transfer of content data.

This field 22 may be divided in a flexible manner into equal timeslots, into information units such as octets, cells, packets, etc.

The frame header 21 comprises a binary clock retrieval and frame rate field 23, or FAW, for Frame Alignment Word, which serves as information for synchronization of the NTs, and a reconfiguration-channel or meta-channel field 24, the content of which can be understood by any item of equipment that has retrieved the rate and synchronization of the frame.

The frame header 21 also comprises an HKC, for "House Keeping Channel", field dedicated to a single MAC layer, comprising data for managing the allocation of the shared resource. This HKC field 25 depends on the transmission format technology used. Accordingly, the structure and the bit rate of this field 25 are likely to change when there is a change of transmission technique. The field 25 conventionally includes physical layer frame management information (PLOAM, for "Physical Layer Operations Administration and Maintenance") with a relatively high real-time constraint, including speaking-time allocation management per NT in the context of a TDMA format.

The meta-channel 24 mainly comprises two fields: a reconfiguration header 26 allowing the management of the configuration interchanges between the LT, for example an OLT, and a plurality of NTs, and a configuration download field 27 for transferring the configuration files themselves.

For the uplink direction, it is possible to set up an uplink reconfiguration channel (reference 34 in FIG. 3), making it possible to respond to the requests from the downlink reconfiguration channel 24 (retrieval of the information necessary to the process), and to verify that switchover requests are correctly taken into account, including the placing in service of a new network termination in which case no payload traffic traveling uplink from this termination is present. In the context of an item of equipment that is already operating, it is possible to be content with using an established resource and with complying with the current format, for example by use of the PLOAM channel. It is also possible to provide a specific uplink reconfiguration channel by default.

The size of the configuration download field 27 may be the result of a compromise between bandwidth consumed permanently by the frame and the download time per NT.

Optionally, it is possible to open the configuration download field 27 only during an upgrade phase. In this case, at each frame, all the NTs must detect the presence of a flag indicating the presence of the offset to be applied to the frame header for a correct analysis, namely switch to the HKC field.

Specifically, the modifications of the MAC layer format are sporadic and may occur a fairly small number of times, for example 2 or 3 times in the life of the NTs. The downloading takes place in hidden time from the client's point of view, and may therefore extend over a relatively long period of time, provided that there is no collision with the availability of the link (in the physical medium sense) preventing any synchronized download or switchover, for example a timer timing out or the NT being placed on standby at the wrong time (for energy-saving reasons for example).

The reconfiguration header 26 (downlink) makes it possible to address the remote NTs or network-termination devices individually and/or collectively, to interrogate the NTs concerning their hardware, software and/or firmware versions, in order to determine which configuration file to send, in order to implement a new frame format. The LT may interrogate the NTs concerning their hardware features in order to list the NTs that are capable of supporting the change of MAC layer format. The LT may also verify the current MAC layer format versions before downloading the configuration files. After the download, the LT can verify the integrality of the downloaded configurations while awaiting switchover. The responses to these interrogations may involve uplink frame structures as described below, with reference to FIG. 3.

The header 26 also makes it possible to instruct a collective or individual switchover to the new MAC layer format. If all the NTs of a given group are present during the download, it is possible to provide a collective switchover. In the case of a new item of NT equipment that is compatible, but not updated, the switchover will be individual after its operating mode has been updated. This new item of equipment starts up in a state in which only one field in the uplink response frame the header 26 is available.

If there is a problem, it may be possible to return to the previous configuration. The header 26 allows the instruction for restoring the previous MAC layer format in the event of a post-switchover problem, and therefore a configuration management on at least two consecutive MAC layer formats.

The configuration download field 27 allows a downloading of the configuration file in message mode. This field 27 can be used also to specify an identifier of the destination NT or NTs. The field 27 may comprise identification bits making it possible to identify the beginning and the end of the file download. The field may comprise checksum bits making it possible to ensure that the whole of the file has been received, that the file transmission instruction has been obeyed and that the content of the file has indeed been retrieved without error.

The reconfiguration channel is designed so as to minimize its impact on the uplink frame, which can be done by the use of a portion of uplink frame existing in the currently applicable uplink frame structure (PLOAM of the current protocol). Alternatively, at the LT, and not solely on the initiative of a unitary transmission format, an uplink channel is defined embracing the time ranging function for the terminations being initialized. This definition can be applied in the context of a PON TDMA shared line, in particular if the user is aiming at genericity while taking account of an NT not yet placed in service, or the choice of no NT update before connection to a PON.

The reconfiguration channel of the uplink frame is recognizable and allows the detailed call registration function or CDR for "Clock and Data Recovery" (regeneration of the data and recognition of the nature of the message). The reconfiguration channel of the uplink frame also carries the acknowledgement of correct receipt of a configuration file. Optionally, the reconfiguration channel of the uplink frame comprises an identifier of the NT, even if this identifier is implicit in the case of addressing by name of the downlink request. The reconfiguration channel of the uplink frame may carry responses to questioning messages of the reconfiguration header field 26 of the downlink frame. For example, the reconfiguration channel of the uplink frame comprises a parameter field allowing the transmission sequentially of an equipment serial number, of a hardware version of the transmission section and of a software version.

FIG. 3 illustrates a typical uplink frame structure according to one embodiment of the invention. The uplink frame 30 comprises an uplink frame header 31 and a field 32 containing the payload. This field 32 can be divided flexibly into variable timeslots, allocated dynamically according to the needs of the NTs, as described in application EP0643505. The granularity of the information units (octets, cells, packets) may also vary. In this example, the field 32 consists of packets.

The uplink frame header 31 comprises a field 33 called the "overhead", this field 33 comprising a minimal pattern fixed by the LT making it possible to retrieve a level of amplitude (a function of the performance of the automatic gain control or AGC electronics or of a TIA, for "transimpedance amplifier", circuit) for the threshold of a regeneration comparator and the retrieval of the sampling clock phase allowing regeneration.

The header 31 also comprises an uplink reconfiguration channel 34 or uplink meta-channel, dedicated to the management of modifications of the MAC layer format of the NTs.

Advantageously, the header 31 also comprises a PLOAM field 35 for the management of bandwidth allocation.

The header 31 is sent by the NT immediately after decoding in the downlink frame of the NT identifier, and with the required response after the request from the downlink reconfiguration channel.

In TDMA, during an interchange with an unlisted NT, the LT takes care to arrange a free response space in the uplink frame in order to prevent any risk of collision.

If the NT is already listed, the distance between the LT and the NT being known, this window of uncertainty can be reduced to the estimated drifts between two cycles for recalculating the distance.

FIG. 4 illustrates a typical algorithm for modifying the MAC layer format of NTs, this algorithm being executable by an LT.

In an initialization phase 40, the LT receives, during a step 45, an instruction to modify the MAC layer format. During a step 46, the overall configuration is stored for backup purposes in the event of failure. Then, during a step 47, certain features of the LT are loaded, and a table of the NTs sharing the line of the LT is set up. The NTs are indexed i, with i varying between 0 and $i_{MAX}$. The index i is initially 0.

There follows a phase 41 of identifying the necessary firmware, this phase using a loop on the indices i. During a step 48, there is a test to ascertain whether the $i^{th}$ NT is present. If it is, the LT interrogates this NT concerning its hardware and firmware version during a step 49.

In a phase 42 for collecting the necessary firmware, all the firmware corresponding to the desired configuration is sought during a step 50. During a step 51, there is a test to ascertain whether this firmware is available and, if necessary, during a step 52, new firmware is developed. As an alternative, it is possible to disinvest the NT or NTs corresponding to unavailable firmware.

In a phase 43 for downloading firmware, a loop indexed by i is used to poll the NTs one after the other. A test is then run, during a step 53, to ascertain whether the $i^{th}$ NT is present, and, if it is, this NT is activated during a step 54. If the $i^{th}$ NT is indeed present, it is possible to proceed with the download during a step 55, for example by using one or more configuration download fields as described above with reference to FIG. 2. During a step 56, a test is run to see whether the configuration has indeed been received, for example by using one or more uplink frames as described with reference to FIG. 3. If it is not the case, during a step 57, an examination is made to ascertain whether a stop instruction has been issued or whether the number of tests has exceeded a threshold.

Finally, in a switchover phase 44, the LT transmits, during a step 58, an instruction to switch over MAC layer format. If a problem is detected during the test step 59, the LT orders a return to the prior configuration during a step 60.

The invention claimed is:

1. A method of communication between a line-termination device and at least one network-termination device, said line-termination device being connected by at least one line to said at least one network-termination device, the method comprising a step of:
   transmitting, by the line-termination device, via said line, to said at least one network-termination device, of frames comprising content data, wherein said frames transmitted by the line-termination device to said at least one network-termination devices comprise:
   a content field designed to transfer the content data originating from the telecommunications network,
   a reconfiguration field capable of transferring reconfiguration data specific to a communication protocol to be used for the transmission of said frames and allowing a reconfiguration of a modem of said at least one network-termination device, and
   said reconfiguration data comprising a reconfiguration file designed to reprogram at least one component of said at least one network-termination device,
   wherein the reconfiguration field is included in a header field of the frames, and the reconfiguration field comprises a configuration download field for transferring the reconfiguration data and a reconfiguration header field for managing the reconfiguration interchanges between the line-termination device and said at least one network-termination device.

2. A method of communication between a line-termination device and a network-termination device, said line-termination device being connected by at least one line to said network-termination device, the method comprising a step of:
   receiving, by the network-termination device, via said line, originating from the line-termination device, of frames comprising content data, wherein said frames received by the network-termination device comprise:
   a content field designed to transfer the content data originating from the telecommunications network,
   a reconfiguration field capable of transferring reconfiguration data specific to a communication protocol to be used for the transmission of said frames and allowing a reconfiguration of a modem of said network-termination device, and
   said reconfiguration data comprising a reconfiguration file designed to reprogram at least one component of said network-termination device,
   wherein the reconfiguration field is included in a header field of the frames, and the reconfiguration field comprises a configuration download field for transferring the reconfiguration data and a reconfiguration header field for managing the reconfiguration interchanges between the line-termination device and said network-termination device.

3. A termination device comprising:
   a frame designed to be transmitted between a line-termination device and at least one network-termination device, said line-termination device being connected by at least one line to said at least one network-termination device,
   said frame comprising a reconfiguration field, and reconfiguration data specific to a communication protocol to be used for the transmission of frames between said line-termination device and said at least one network-termination device,
   said reconfiguration data allowing a reconfiguration of a modem of said at least one network-termination device,
   said reconfiguration data comprising a reconfiguration file designed to reprogram at least one component of said at least one network-termination device, and
   said reconfiguration field is included in a header field of the frame, and said reconfiguration field comprises a configuration download field for transferring the reconfiguration data and a reconfiguration header field for managing the reconfiguration interchanges between the line-termination device and said at least one network-termination device.

4. The termination device according to claim 3, wherein the frame further comprises a content field designed to transfer content data originating from a telecommunications network connected to said line-termination device, and said reconfiguration field is capable of transferring reconfiguration data capable of modifying said protocol.

5. A line-termination device designed to be connected by at least one line to at least one network-termination device, said line-termination device being arranged to transmit, via said line to said at least one network-termination device, frames comprising:
- content data, and reconfiguration data specific to a communication protocol to be used for the transmission of said frames and allowing a reconfiguration of a modem of said at least one network-termination device,
- said reconfiguration data comprising a reconfiguration file designed to reprogram at least one component of said at least one network-termination device, and
- a reconfiguration field, wherein the reconfiguration field is included in a header field of the frame, and the reconfiguration field comprises a configuration download field for transferring the reconfiguration data and a reconfiguration header field for managing the reconfiguration interchanges between the line-termination device and said at least one network-termination device.

6. A network-termination device designed to be connected by at least one line to a line-termination device, the network-termination device being arranged to receive, via said line, frames comprising:
- content data originating from the network-termination device, and reconfiguration data originating from the line-termination device, said reconfiguration data being specific to a communication protocol to be used for the transmission of said frames and allowing a reconfiguration of a modem of said network-termination device,
- said reconfiguration data comprising a reconfiguration file designed to reprogram at least one component of said network-termination device, and
- a reconfiguration field, wherein the reconfiguration field is included in a header field of the frame, and the reconfiguration field comprises a configuration download field for transferring the reconfiguration data and a reconfiguration header field for managing the reconfiguration interchanges between the line-termination device and said network-termination device.

7. A non-transitory computer readable medium comprising code instructions for performing the method of claim 1.

8. A non-transitory computer readable medium comprising code instructions for performing the method of claim 2.

* * * * *